United States Patent [19]

Drews

[11] 4,284,328
[45] Aug. 18, 1981

[54] VEHICLE SAFETY FENDER TRIM

[76] Inventor: John W. Drews, 2172 Eastview Dr., Des Plaines, Ill. 60018

[21] Appl. No.: 112,345

[22] Filed: Jan. 15, 1980

[51] Int. Cl.³ .............................................. G02B 5/12
[52] U.S. Cl. ...................................................... 350/97
[58] Field of Search .................................. 350/97–105, 350/106; 404/13; 40/556, 582, 903, 208; D11/165, 185

[56] References Cited

U.S. PATENT DOCUMENTS

| | | | |
|---|---|---|---|
| 1,930,376 | 10/1933 | Willett | 350/97 |
| 1,943,440 | 1/1934 | Horni | 350/97 |
| 3,948,205 | 4/1976 | Korten | 350/97 |

Primary Examiner—John K. Corbin
Assistant Examiner—B. W. de los Reyes
Attorney, Agent, or Firm—Sixbey, Friedman & Leedom

[57] ABSTRACT

This invention relates to safety fender trims mounted vertically on fender flanges at the motor vehicle wheel openings which not only perform improved water splash arrest and mud guard functions, but, with motor vehicles of increasingly varying widths on the roads, the trims primarily augment night driving safety particularly for the user, as well as others. Light reflective disc targets are bonded to fender trim extensions on the user car to reflect rearwardly, forwardly, or preferably both rearwardly and forwardly, the head light beams of other vehicles to pinpoint the presence of the user car in traffic, its width, and whether it is moving or parked. These disc targets reduce flashing reflected glare by diffusing the incident parallel ray beams reflected, not only to widen the visibility for others over a wide viewing angle, but also to reduce glare and sharpen perception and discrimination by the reduced intensity of the reflections to all cars for assisting others in perceiving the presence, size and distance and orientation of the user vehicle.

10 Claims, 5 Drawing Figures

U.S. Patent  Aug. 18, 1981  4,284,328
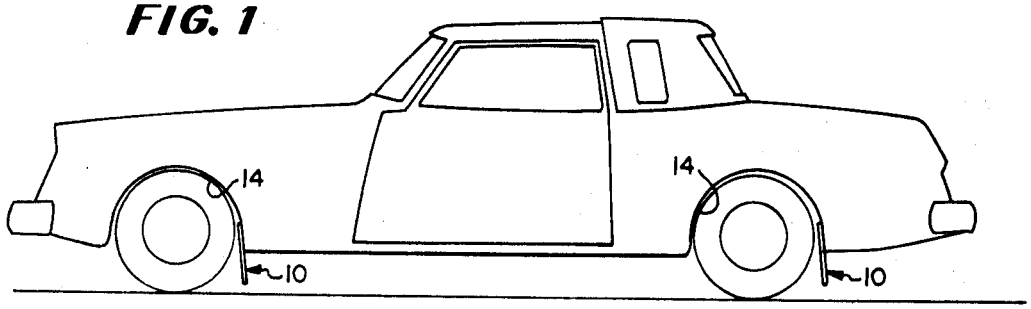
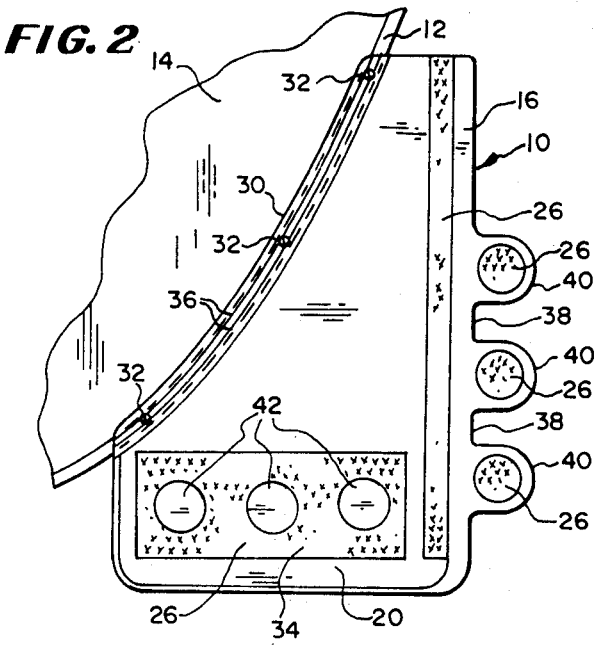
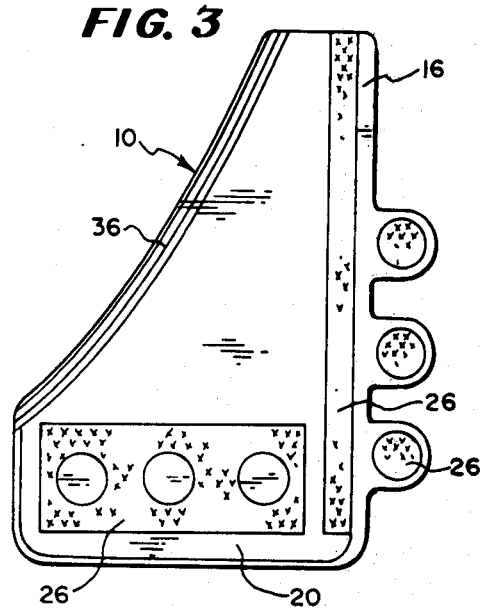
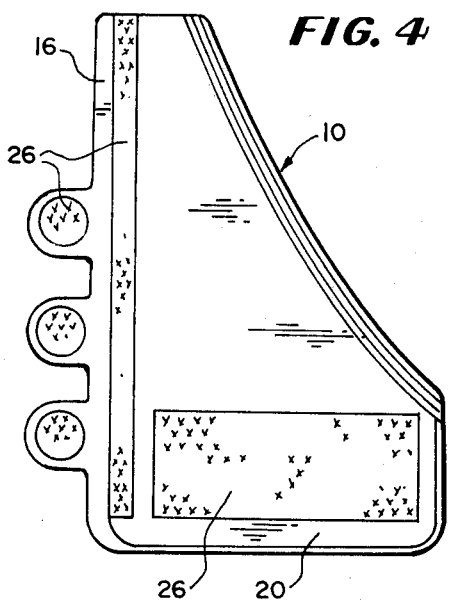
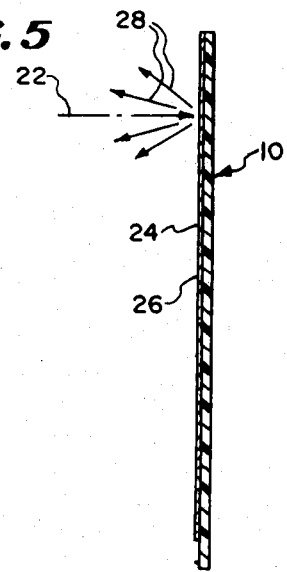

_4,284,328_

VEHICLE SAFETY FENDER TRIM

BACKGROUND OF THE INVENTION

Heretofore, vertically disposed automobile splash guards have been secured to fenders at wheel openings, and in some instances extend in a lateral direction beyond the front and rear fender lines for any one of a number of purposes, including flexible splash and mud deflectors, flaps, trim members, lateral reflectors, lights and decorations for decor. However, as mud guards, they are unslightly in wet weather and deflect mud to other parts of the car with a turbulent air flow, vibrating and making wind noises, and, any reflector buttons present are essentially decorative, or are blinding and difficult or erratic for others to perceive, interpret or rely upon for perception of distance. Also they are difficult to repair if damaged.

OBJECTS OF THE INVENTION

The primary object of the invention is to both protect a vehicle body from road mud, and to quicken and assist safety reactions and responses of drivers of other cars with decorative, reflective, non-blinding safety devices which reduce motor vehicle rear end accidents, sideswiping and collisions. These devices effect early and clear visual warnings for alerting surrounding drivers of driving dangers which rapidly increase with growing darkness when pupils dilate, depth of color and perception of moving objects by human sight diminish as daylight dims, as darkness deepens, and the perception of color by the eye fades rapidly, primarily because the visual acuity of human cone vision drops with low or fading levels of illumination, and acuity of human rod vision becomes primarily peripheral and spherical aberration occurs due to enlargement of the pupil of the human eye.

Furthermore, the present invention provides decorative side extensions for a vehicle that not only afford protection but also support decorative, useful, diffusion reflectors to provide a wider viewing angle for surrounding traffic, and, moreover include light beam diffusing means in appropriately selected colors that reflectively provide non-glaring, non-blinding diffused light to provide clearly shaped outlines and visual image perceptions for others at twilight, and in the dark, throughout an intentionally and critically wide spread viewing angle.

These and other objects will appear and be observed as the description proceeds related to the drawings wherein:

IN THE DRAWINGS

FIG. 1 is a side elevation of a four wheel passenger automobile illustrating fender trims mounted on the fenders for wide angle reflection of diffused colored light.

FIG. 2 is a plan view of the visible side of the trim when it is mounted in place on a fender.

FIG. 3 is a plan view of the visible side of the trim indicating the preferred color arrangement when mounted on the non-passing side of automobiles.

FIG. 4 is a plan view of the visible side of the trim member indicating the preferred color arrangement when mounted on the passing side of the automobile.

FIG. 5 is a sectional view normal to a reflector indicating the parallel rays of headlights being reflectively diffused to reduce the intensity of the reflected light reaching the eye of an overtaking driver.

DESCRIPTION OF THE INVENTION

In the present invention, the fender attachment 10 is form-molded of a light weight, non-brittle polycarbonate resin thermoplastic such as that sold under the trademark LEXAN by General Electric Co. and is secured to inturned edges 12 of the fender wells 14 of a vehicle to provide an exposed, essentially vertical edge portion 16 extending horizontally beyond the fender line to be seen fore and aft and on both sides by other driven cars approaching or passing the equipped car. The attachment has a depending portion 20 extending below the fender contour which can be seen from an appreciable wide angle and at a distance ahead of or behind the wheel access opening of the fender on which it is mounted.

Referring to FIG. 1, the left side or passing side of a motor vehicle subjected in part to beams 22 of the headlights of a passing vehicle is illustrated preferably in which targets of pressure sensitive polyester film coated diffraction material 24, having geometric multidirectional reflectivity of selected colors, are adhered to determined areas, and diffuse the substantially parallel rays 22 of the headlight beams of other cars that are reflected from the vertical color stripes or targets 26 of selected color on the fender trim members 10 of the invention in rays 28 that are sufficiently diverged to reduce the reflected intensity upon the eyes of the driver of the passing vehicle to a comfortable perception and viewing level. The reflective material may be applied crushed diffraction glass, plastic phosphorent particles or iridescent paint or decals of geometric shapes, letters or symbols. Reflectors closely spaced horizontally would indicate a two wheel vehicle.

The trim member 10 shown in plan in FIG. 2 has essentially the shape of a right triangle with the hypotenuse edge 30 thereof cut to shape and flexed to overlap the flange 12 of a fender around the wheel well, yet is flexible enough to be secured thereto in supported relation by sheet metal screws 32 without significantly reducing its efficiency with the vertically wide horizontally disposed reflective leg portion 34 when present, extending below the lower edge of the fender.

Structurally, the body is ribbed marginally on the two legs and along lines 36 diverging from the minor angle to the opposite leg whereby a trim line can be selected for matching the fender flange shape to which it will be fastened as a unitary molding so that either side of the translucent member can be finalized significantly for directional mounting fore or aft. Thereby the main form of the invention is singularized to be initially identical for right and left hand applications.

The vertical edge portion 16 is mounted to extend laterally in a horizontal direction beyond the fender line of the automobile and is preferably notched away at vertically spaced points 38 while the remaining vertically spaced tab-like portions 40 each are illustrated as having a plurality of the highly reflective light diffusing targets 26, approximately one inch in diameter disposed at vertically spaced distances substantially greater than their individual vertical dimensions, leaving the spaces between them notched away at 38 to a width substantially equal to the horizontal width of the targets to eliminate wind noise and drag, and provide non-pulsating air currents at this point that tend to wipe the faces of the targets from around the edges that border the target a major portion of its circumference. Such keeps the color targets 26 clean in wet driving.

Preferably, the vertically spaced semi-circular extensions 40 are formed to carry red or yellow diffractive light diffusing reflective targets 26 of determined size that are vertically spaced from one another a distance appreciably greater than their vertical dimensions to provide readily distinguishable non-blinding individualized spaced targets for an observer within wide angles and an appreciable visual depth or distance perception which assists in fractions of a second driver reactions that avoid accidents even though a viewing driver may have impaired color discrimination.

Contrasting with the areas of the targets 26 the remainder of the reflective patch 34 from which the targets are cut is an elongated patch mounted horizontally below the fender level where it can be seen with non-blinding illumination uniformity from a following car located a substantial distance away from the car carrying the patch.

Preferably opaque holes 42 are left in the light diffusing reflector patch 34 from which the circular targets 26 are cut, economically, and when applied to the lower face portion of the trim element 10 provides at night distinct sharp lines of comparison as well as directional orientation for the observer in an approaching or passing second car, both independently and with respect to the sameness of sizes of opaqueness and reflective images being viewed.

Only the color area need be specialized and then the color selected can be located and secured in the panel defined by rim-frames molded on either side but preferably both sides for universal selective use.

The fender attachment holes may be drilled upon installation to locate the trim member 10 and the non-rusting sheet metal screws 32 to attach the trim member under a nonvibrating flexed tension.

Furthermore, distinctive colors are used in relation to potential dangers to distinguish the front end of an automobile at night from the rear end for indicating the possible direction of movement or position.

The extended decorative, reflective splash guards 10 are weatherproof and of a hard glass surface, wash clean in the presence of a flowable liquid including a squirt of water from any radiator filling hose in a service station.

Furthermore, the reflectors 10 are mirror images in symmetrical pairs and with present day automobile fenders can be mounted on the fenders in front of wheels or to the rear of the wheels, or with respect to either the front wheels or the rear wheels, or both front and rear wheels, for complete versatility, to meet any kind of traffic pattern which any particular automobile is expected to encounter whether an emergency or passenger vehicle is involved or not.

The extensions 40 with reflective material act as non-flashing reflections of diffused bright light beams readily seen in a pattern that commands attention and understanding for approaching traffic.

Preferably in right hand drive jurisdictions the location of colors are significant. For example, the right front should be red and red, the left front yellow and yellow. Rearwardly, the left side should be red rear and yellow forward and the right side should be red rear, and yellow forward.

The extensions 40 with reflective material act as non-flashing reflections of diffused bright light beams readily seen in a pattern that commands attention and understanding for approaching traffic.

The location of red colors can mean wrong passing side, yellow can mean caution, and if the overtaking car is well behind, the lower end 34 of both trims can be seen below the body fender line, with the left one showing yellow and the right one red, indicating the position and direction of the car movement and the right and wrong side to pass.

It may also be noted that the invention is self-educating in that it is not only appealing to the eye but others appreciate its significance as the differences in colors are considered, the differences themselves inviting understanding.

What is claimed is:

1. A traffic signal fender trim member for motor vehicles comprising a substantially flat, flexible body member having a bottom edge, an outermost edge intended to extend vertically away from said bottom edge when said signal trim member is secured to a motor vehicle, said outermost edge having spaced tab members extending laterally therefrom, the space between adjacent ones of said tab members exceeding the vertical dimension of said tab members, and light reflective targets provided on said spaced tab members.

2. A traffic signal fender trim member for motor vehicles comprising a substantially flat, unitary flexible body member having a bottom edge, an outermost edge formed to extend vertically away from said bottom edge when said signal trim member is secured to a vehicle fender, said outermost edge having a plurality of vertically spaced tab members extending laterally therefrom, and light reflective targets provided on each of said spaced tab members, said spaced tab members and targets being formed to provide a space between adjacent ones of said targets which exceeds the vertical dimension of said targets.

3. The traffic signal fender trim member of claim 2, wherein said body member includes an innermost edge extending from said bottom edge which is configured to conform to the configuration of a vehicle fender to which said trim member is attached, said trim member being adapted for attachment to a vehicle fender along said innermost edge.

4. The traffic signal fender trim member of claim 3, wherein spaced ribs extend from both sides of said body member and run along said innermost edge.

5. The traffic signal fender trim member of claim 2, wherein a vertically disposed light reflective target is provided on said body spaced from and bordering said tab members.

6. The traffic signal fender trim member of claim 5, wherein a horizontal light reflective target is provided on said body member formed from a horizontal strip section bordering said bottom edge.

7. The traffic signal fender trim member of claim 6, wherein said light reflective targets are formed from light diffusing material and are provided upon opposite surfaces of said body member.

8. The traffic signal fender trim member of claim 6, wherein said horizontal light reflective target is provided with spaced, non-reflective portions of approximately the same size and shape as the reflective targets provided on said tab members.

9. The traffic signal fender trim member of claim 7, wherein said target members are formed of a pressure sensitive polyester film-coated diffraction material of geometric multidirectional reflective design in selected colors.

10. A traffic signal fender trim member for motor vehicles comprising a substantially flat, unitary flexible body member having a bottom edge, an outermost edge formed to extend vertically away from said bottom edge when said signal trim member is secured to a vehicle fender, an innermost edge extending away from said bottom edge and configured to conform to the configuration of a vehicle fender to which said trim member is attached, said innermost edge extending angularly from said bottom edge toward said outermost edge, the portion of said body member adjacent said innermost edge being reinforced for attachment to said vehicle fender, and vertically spaced light reflective targets secured to said body member adjacent to said outermost edge, said targets being secured to both sides of said body member with the space between adjacent ones of said targets exceeding the vertical dimension of said targets.

* * * * *